(12) United States Patent
Schaefer et al.

(10) Patent No.: US 9,745,145 B2
(45) Date of Patent: Aug. 29, 2017

(54) PACKING BAY SYSTEM FOR A GOODS CHECKOUT SYSTEM

(71) Applicant: WINCOR NIXDORF INTERNATIONAL GMBH, Paderborn (DE)

(72) Inventors: Oliver Schaefer, Berlin (DE); Andreas Doell, Berlin (DE); Hans-Juergen Doell, Erfurt (DE)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 0 days.

(21) Appl. No.: 14/745,748

(22) Filed: Jun. 22, 2015

(65) Prior Publication Data

US 2015/0368050 A1    Dec. 24, 2015

(30) Foreign Application Priority Data

Jun. 23, 2014  (EP) .................................... 14173526

(51) Int. Cl.
*B65G 47/76* (2006.01)
*A47F 9/04* (2006.01)

(52) U.S. Cl.
CPC .............. *B65G 47/766* (2013.01); *A47F 9/04* (2013.01); *A47F 2009/041* (2013.01)

(58) Field of Classification Search
CPC .... A47F 9/04; A47F 2009/041; B65G 47/766
USPC ........................................................ 198/367
See application file for complete search history.

(56) References Cited

U.S. PATENT DOCUMENTS

| | | | | |
|---|---|---|---|---|
| 2,569,711 A | * | 10/1951 | Foster ....................... | A47F 9/04 186/68 |
| 2,625,241 A | * | 1/1953 | Smith ....................... | A47F 9/04 186/68 |
| 2,723,728 A | * | 11/1955 | Crawford .................. | A47F 9/04 186/66 |
| 2,776,730 A | * | 1/1957 | Crawford .................. | A47F 9/04 186/66 |
| 6,220,422 B1 | | 4/2001 | Lee | |
| 6,910,568 B1 | | 6/2005 | Ydoate et al. | |
| 7,147,097 B2 | * | 12/2006 | Lemm ................... | B65G 47/766 198/351 |
| 7,516,818 B2 | * | 4/2009 | Harris ....................... | A47F 9/04 160/238 |

(Continued)

*Primary Examiner* — Thomas Randazzo
(74) *Attorney, Agent, or Firm* — Gerald E. Hespos; Michael J. Porco; Matthew T. Hespos

(57) ABSTRACT

A packing bay system for a goods checkout system has several packing bays for taking up goods, a conveying device which includes at least one conveyor belt section for conveying goods in a conveying direction, and a goods switch which is adjustably arranged on the conveying device and includes a diverting wall longitudinally extending along a direction of longitudinal extension. In a first position, the goods switch with the diverting wall extends at an angle to the conveying direction across the at least one conveyor section, in order to guide goods which on conveyance in the conveying direction get in contact with the diverting wall in a diverting direction directed parallel to the direction of longitudinal extension from the at least one conveyor section towards a first packing bay. The goods switch is adjustable from the first position into a second position.

9 Claims, 13 Drawing Sheets

(56) References Cited

U.S. PATENT DOCUMENTS

| | | | |
|---|---|---|---|
| 8,783,438 B2* | 7/2014 | Phan | A47F 9/04 |
| | | | 186/61 |
| 2012/0181145 A1 | 7/2012 | Rogers et al. | |
| 2013/0062159 A1* | 3/2013 | Fischer | A47F 9/048 |
| | | | 198/367 |
| 2014/0021260 A1* | 1/2014 | Cherry | G06K 7/01 |
| | | | 235/475 |
| 2015/0194023 A1* | 7/2015 | Brackenridge | G06Q 30/06 |
| | | | 235/380 |
| 2015/0356535 A1* | 12/2015 | Hassman | A47F 9/048 |
| | | | 705/23 |

* cited by examiner

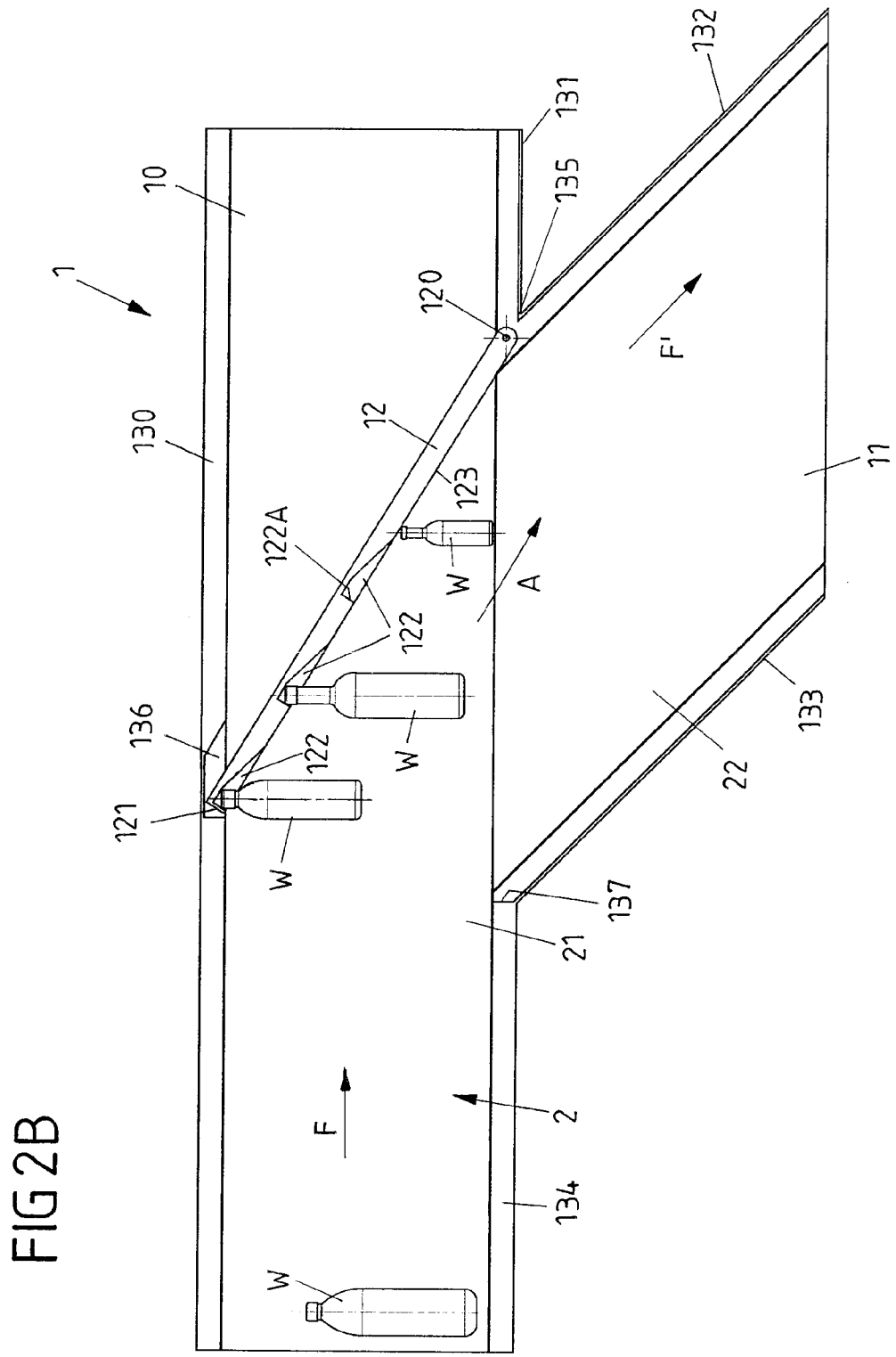

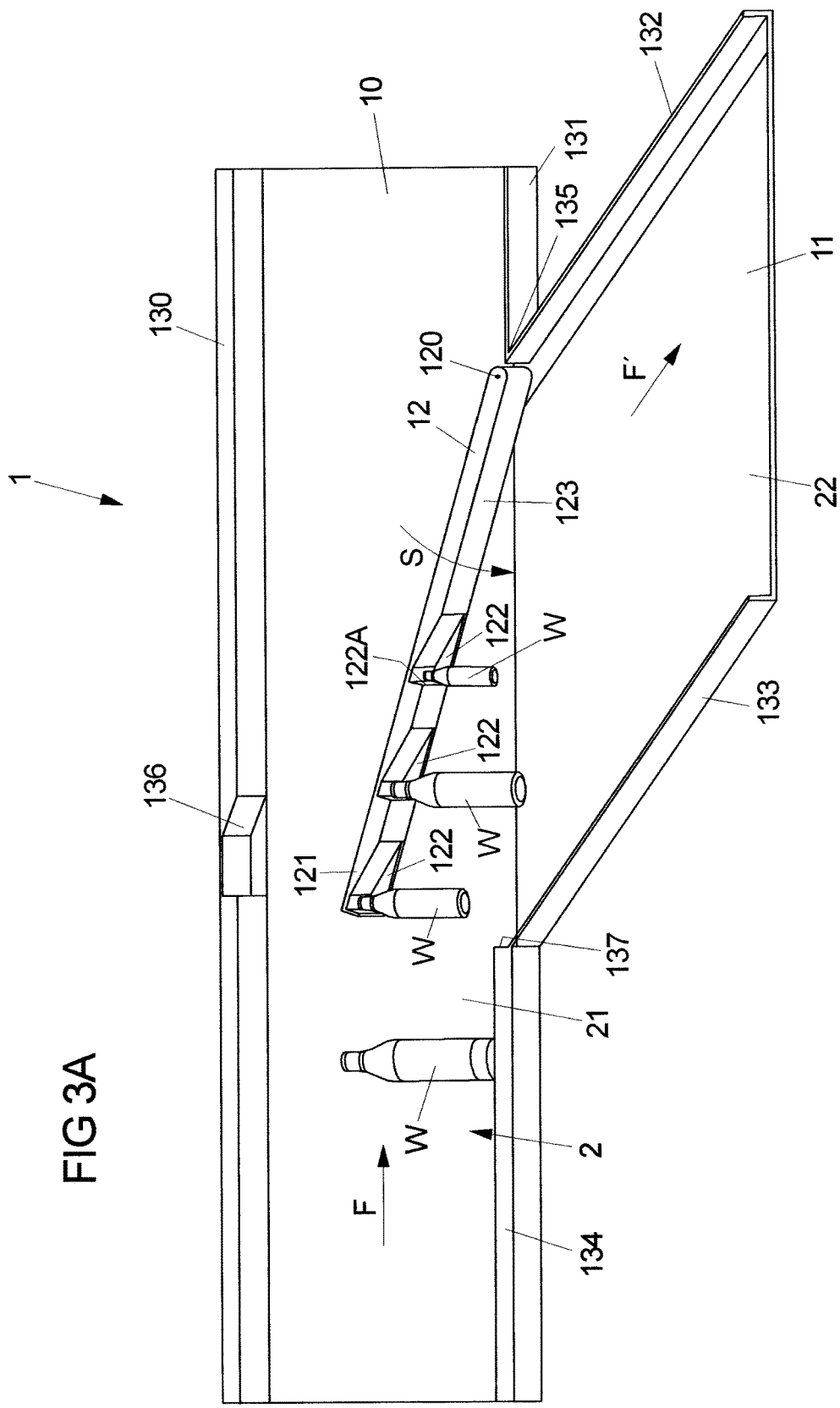

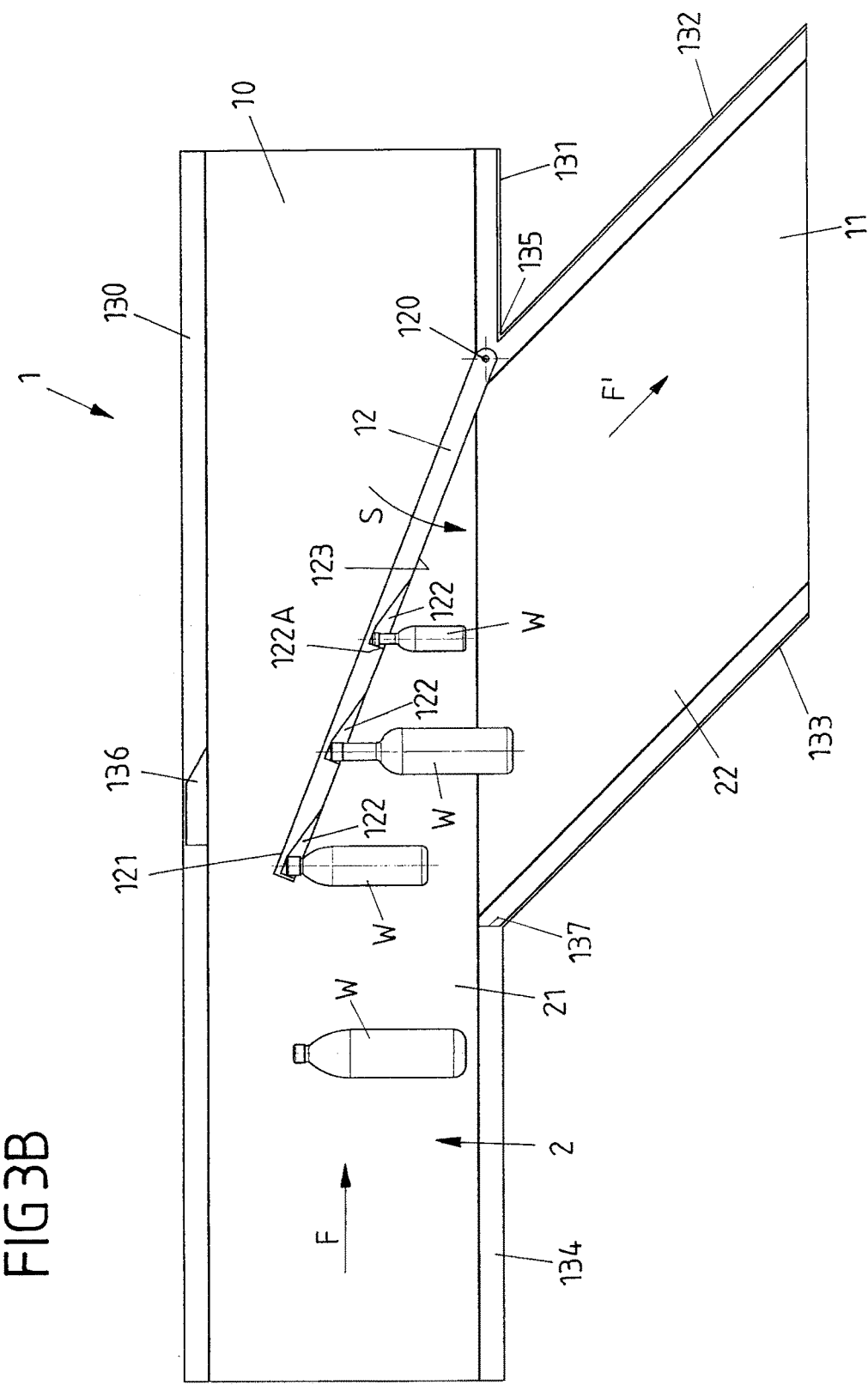

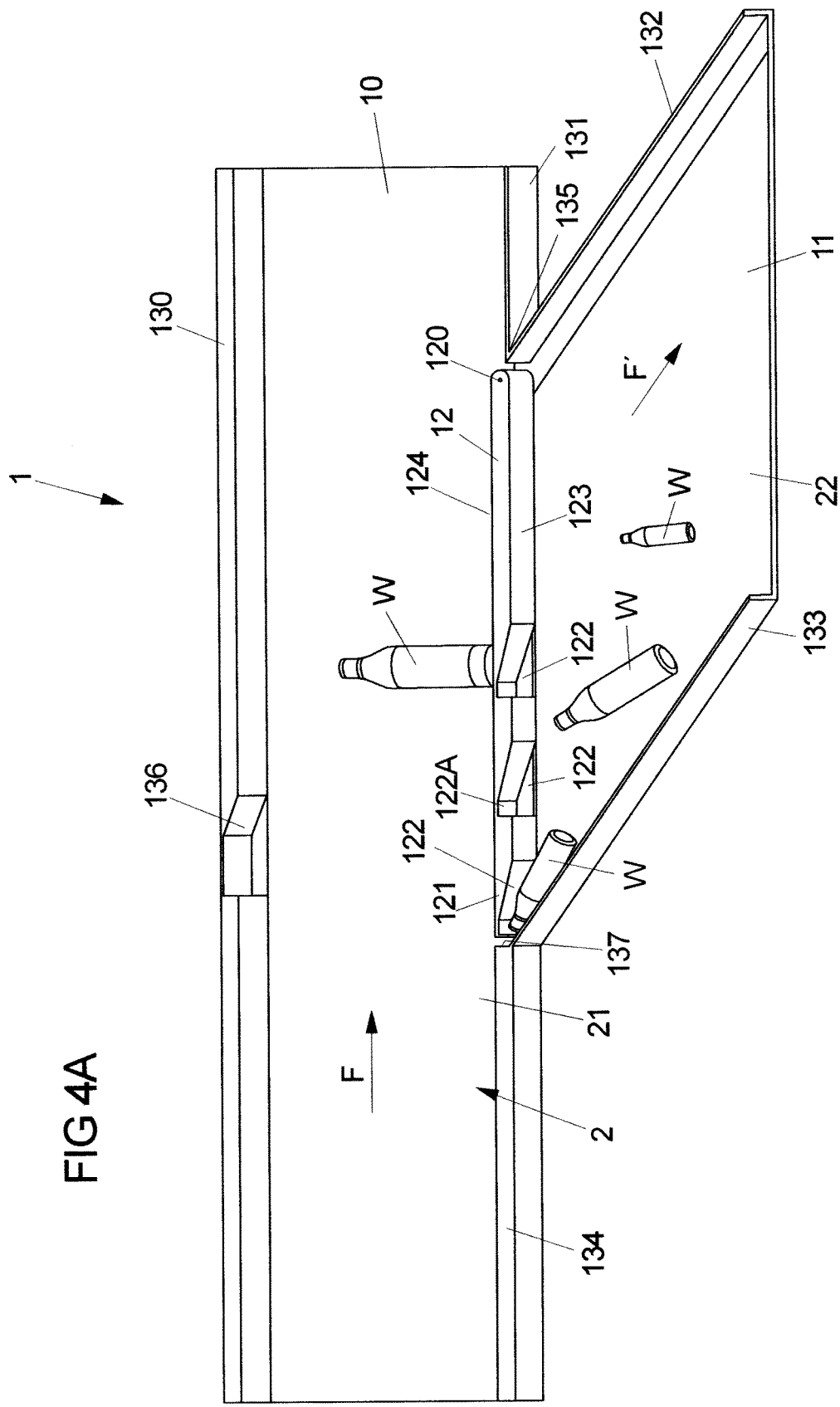

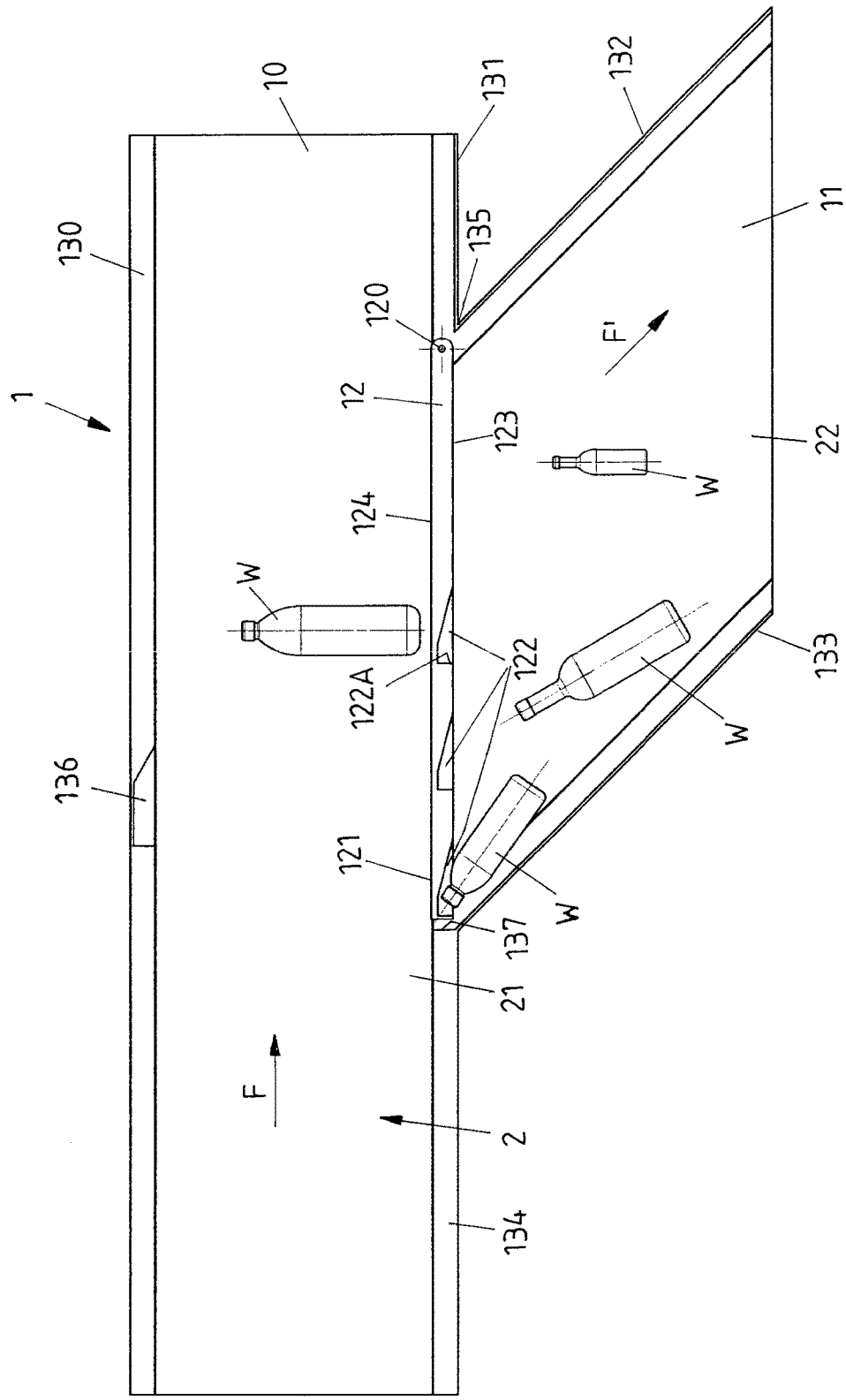

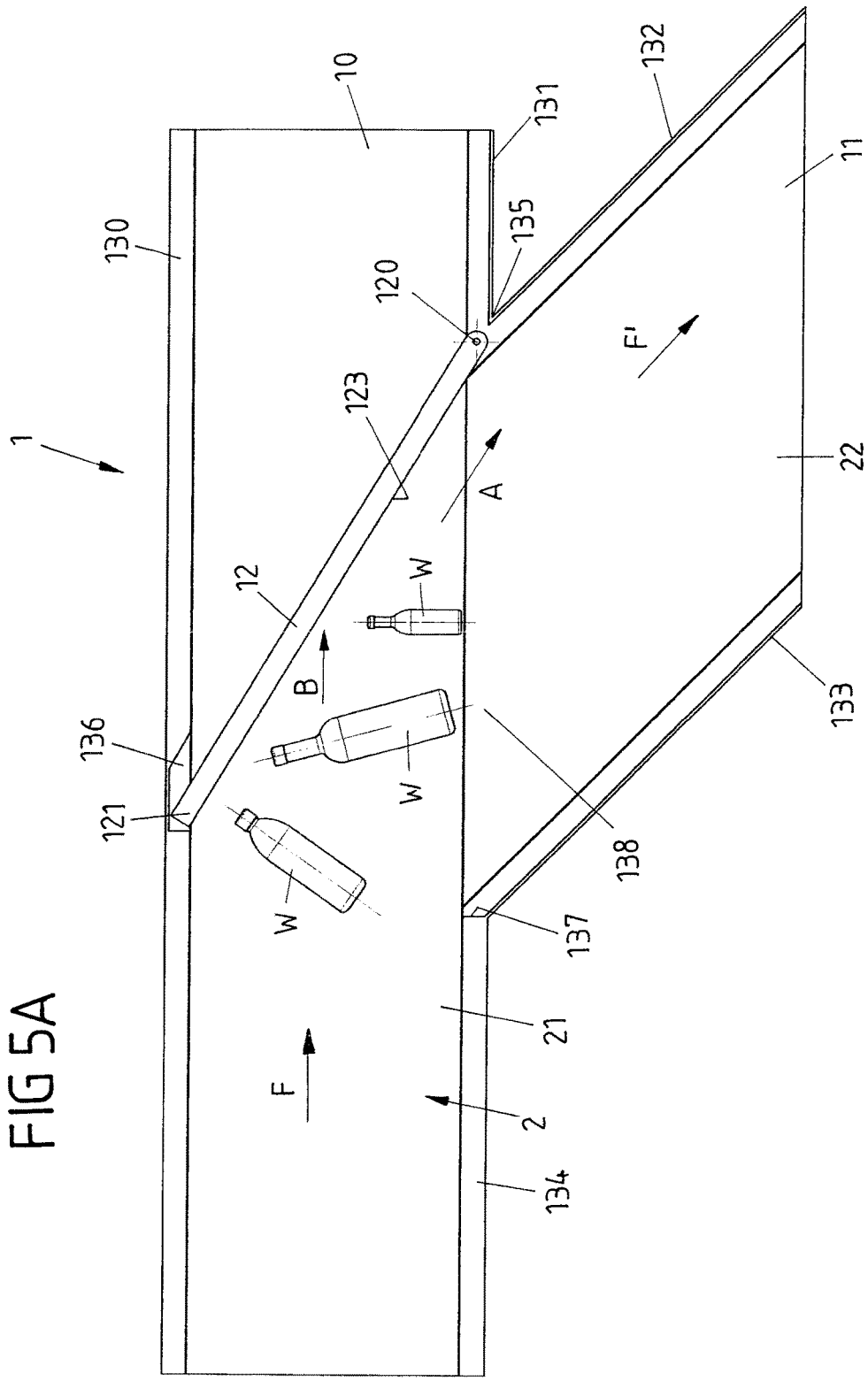

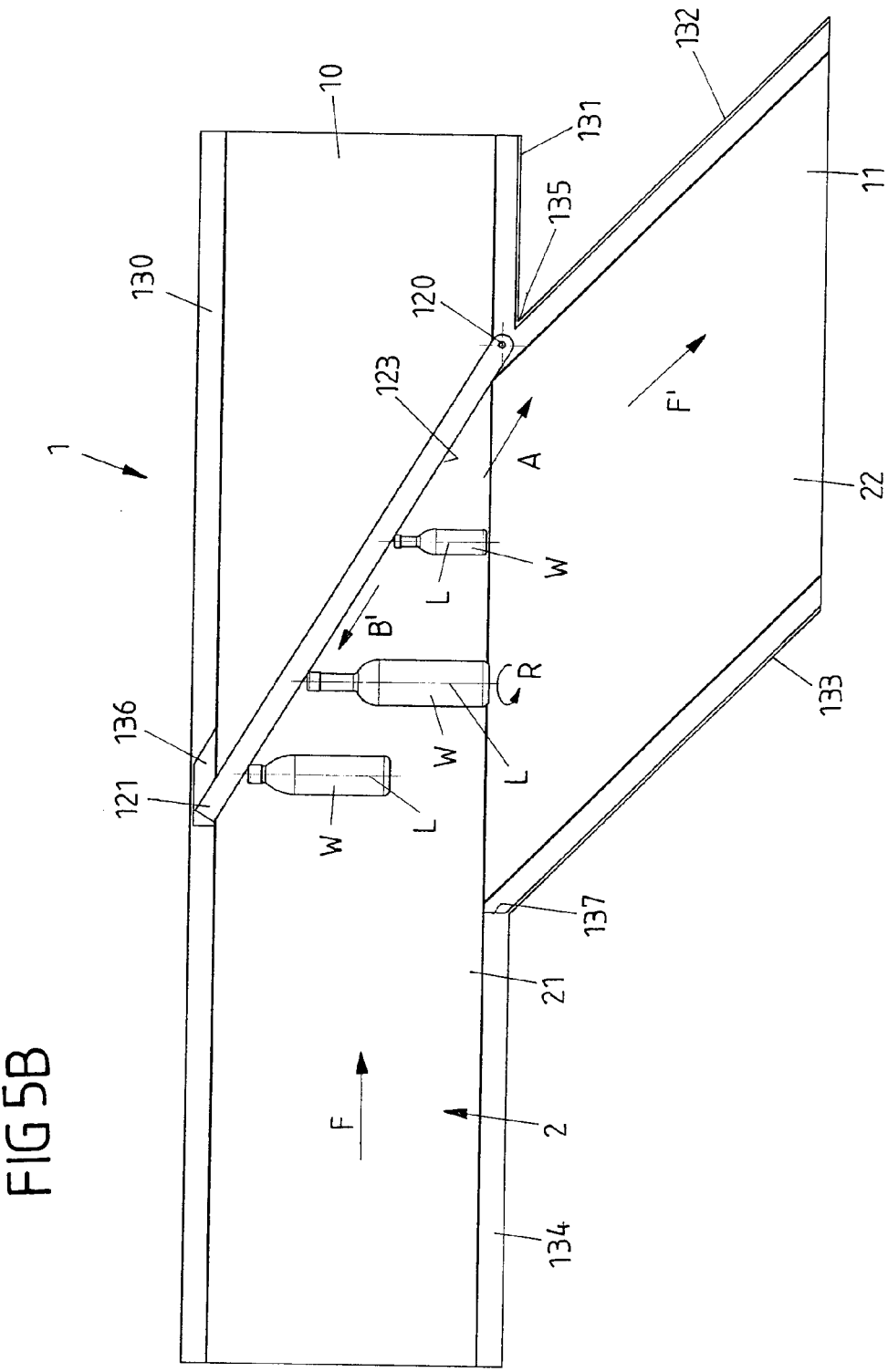

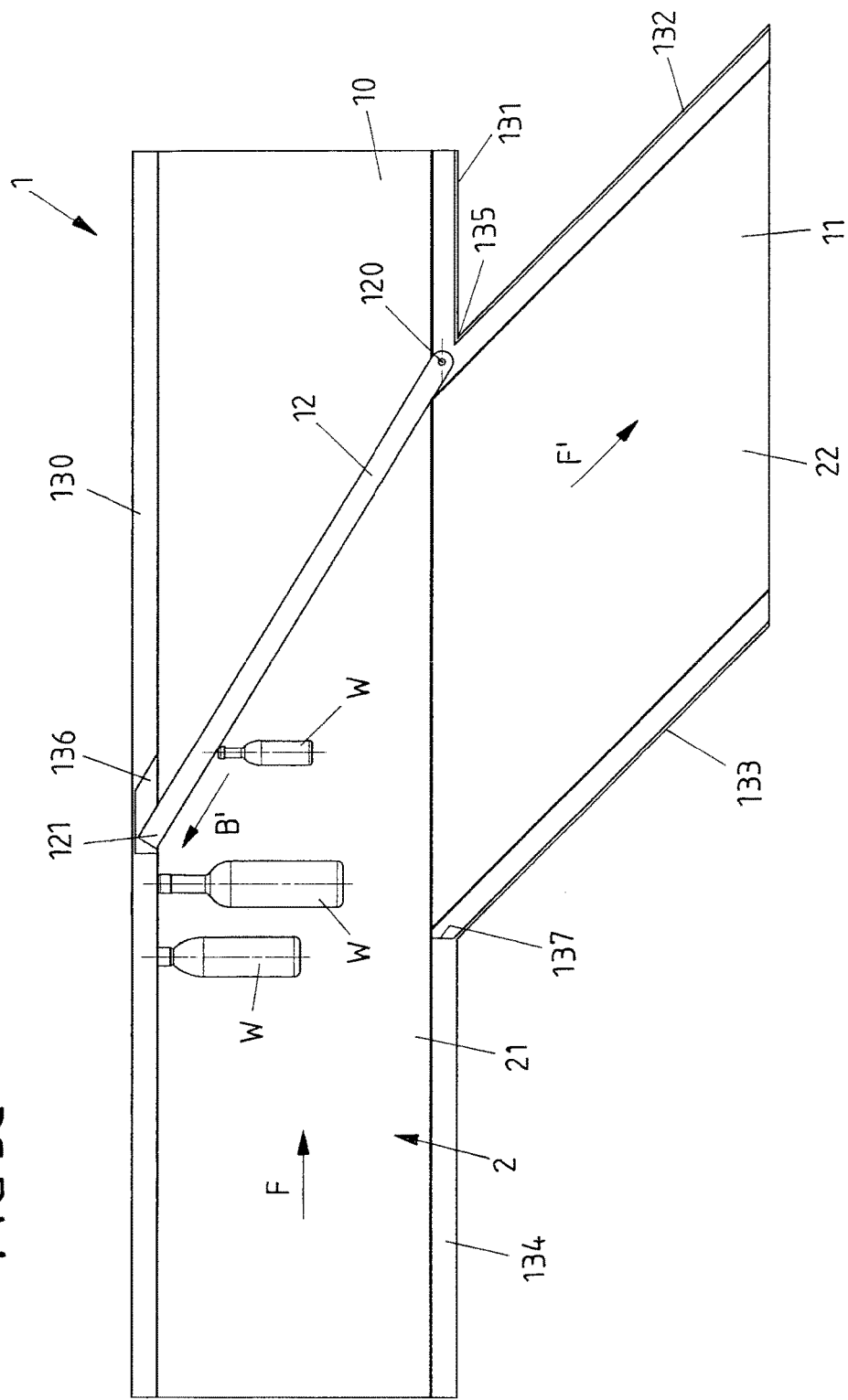

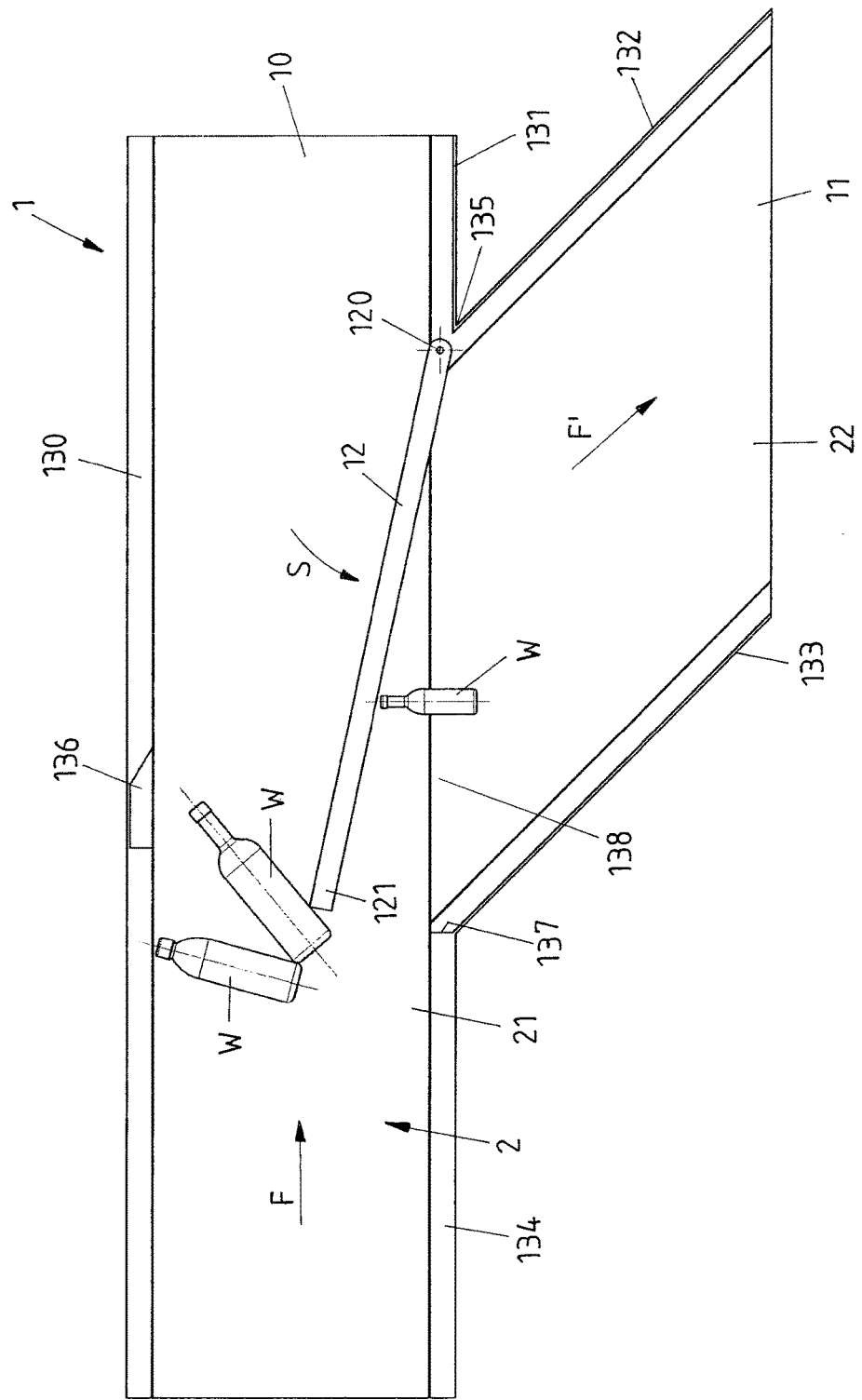

PACKING BAY SYSTEM FOR A GOODS CHECKOUT SYSTEM

CROSS REFERENCE TO RELATED APPLICATION

This application claims priority under 35 USC 119 to European Patent Appl. No. 14173526.6 filed on Jun. 23, 2014, the entire disclosure of which is incorporated herein by reference.

BACKGROUND

1. Field of the Invention

This invention relates to packing bay system for a goods checkout system.

2. Description of the Related Art

Such packing bay system comprises several packing bays for taking up goods and a conveying device which includes at least one conveyor belt section for conveying goods in a conveying direction towards the packing bays. On the conveying device an adjustable goods switch is arranged, which includes a diverting wall longitudinally extending along a direction of longitudinal extension. In a first position, the diverting wall of the goods switch extends at an angle to the conveying direction across the at least one conveyor section, in order to guide goods which on conveyance in the conveying direction get in contact with the diverting wall in a diverting direction directed parallel to the direction of longitudinal extension from the at least one conveyor section towards a first packing bay. From the first position the goods switch then can be adjusted into a second position, in order to convey goods towards at least one other, second packing bay.

Such packing bay system can be used for example in a supermarket environment or in some other department store, for example in a furniture store or in other retail stores. Such packing bay system can be used at a conventional checkout unit, in which a cashier scans in goods by means of a suitable scanner and then puts said goods on a conveying device for conveyance into packing bays. Such packing bay system can, however, also be used in goods checkout systems which provide for a goods checkout carried out automatically by a customer and are able to detect goods automatically—without interaction by a cashier.

In such packing bay system goods are guided towards a packing bay via a conveyor belt section, wherein the goods switch extends across the conveyor belt section, in order to divert goods from the conveyor belt section towards an associated packing bay. When goods in the form of cylindrical bottles, cans or the like, which can roll on the conveyor belt section, are conveyed on the conveyor belt section, it can occur that the goods strike against the goods switch and due to the conveying movement of the conveyor belt section are put into a rolling movement at the goods switch. Due to resting against the goods switch and the resulting frictional contact between the rolling goods, it can be effected that the goods move along the goods switch against the diverting direction and thus are not diverted—as actually desired—from the conveyor belt section in diverting direction, but remain on the conveyor belt section. When the goods switch now is adjusted, it can occur that goods remain on the conveyor belt section, which actually should have been diverted into a packing bay. This can lead to the fact that a customer pays for goods, but does not get the same, because they do not get into a packing bay associated to this customer.

It is an object of the present invention to ensure reliable diverting of goods via a goods switch.

SUMMARY

According to an exemplary embodiment of the invention the goods switch includes at least one discontinuity on the diverting wall, to prevent a movement of goods along the diverting wall against the diverting direction.

The discontinuity for example can be formed as depression molded into the diverting wall. It is, however, also conceivable and possible that the discontinuity is formed as protrusion arranged on the diverting wall, for example in the manner of a web vertically extending on the diverting wall transversely to the diverting direction.

Advantageously, the discontinuity forms at least one transverse flank extending transversely to the direction of longitudinal extension, with which goods get in contact during a movement along the diverting wall against the diverting direction.

The present invention proceeds from the finding that a movement of goods against the diverting direction along the diverting wall of the goods switch advantageously should be prevented. To prevent a movement of goods against the diverting direction along the diverting wall of the goods switch, at least one discontinuity therefore is formed on the diverting wall, for example in the form of a protruding web or a depression molded into the diverting wall, with which a merchandise gets in contact during a movement along the diverting wall against the diverting direction, so that the merchandise cannot be moved (further) along the diverting wall.

Such discontinuity in particular is advantageous to prevent a counter-movement of cylindrical, rollable goods. Due to the frictional contact with the diverting wall it can occur in such cylindrical, rollable goods that the goods are put into a rolling movement and in the case of a diverting wall extending obliquely to the conveying direction are moved against the diverting direction along the diverting wall. When such merchandise however gets in interaction with the discontinuity, a (further) movement of the merchandise against the diverting direction is prevented, so that the merchandise cannot get out of the region of the goods switch, and when the goods switch is adjusted out of its first position, thus is reliably conveyed into the (first) packing bay into which goods are to be diverted in the first position of the goods switch.

The basic function of the goods switch is to divert goods in the diverting direction from the conveyor belt section towards an associated packing bay. Such diverting generally is effected reliably with non-rollable goods, which when striking against the goods switch slide in the diverting direction along the diverting wall of the goods switch and thus are guided towards the packing bay. Such diverting in the diverting direction should not be prevented. Correspondingly, the discontinuity is formed such that a movement of goods in the diverting direction along the diverting wall is not prevented.

Advantageously, several discontinuities are formed on the diverting wall. These several discontinuities are arranged on the diverting wall offset to each other along the direction of longitudinal extension, so that different goods can interact with different discontinuities.

In particular when several discontinuities are formed on the diverting wall, the same can have a sawtooth shape in an advantageous aspect. The sawtooth shape here consists in a cross-sectional plane transversely to the diverting direction and transversely to the conveying direction and can be described by a flank extending substantially vertically to the diverting direction and a flank extending obliquely to the diverting direction. The vertical flank here is arranged such that in the case of a movement against the diverting direction goods strike against the vertical board and thus cannot be moved further along the diverting wall.

The goods switch preferably is formed web- or rod-shaped and longitudinally extends along the direction of longitudinal extension. The goods switch here for example at one end is pivotally connected with a boundary wall laterally defining the at least one conveyor section and can be pivoted to the boundary wall along a swivel direction. In the first position, the goods switch extends at an angle to the conveying direction across the conveyor section. The goods switch can be pivoted out of this first position, in order to convey goods towards another packing bay in a second position.

In the first position, the goods switch extends at an angle to the conveying direction. It thereby is meant that the goods switch extends at an angle to the conveying direction unequal to 0° and thus at least partly blocks a conveying path on the conveyor section directed along the conveying direction, so that goods can be diverted from the conveyor section via the goods switch.

In the first position, the goods switch in particular extends obliquely to the conveying direction such that the diverting direction includes an acute angle with the conveying direction. By striking against the goods switch, the goods thus are diverted at the goods switch and conveyed towards a packing bay adjoining the goods switch.

In the second position, on the other hand, the goods switch for example can be directed approximately parallel to the conveying direction, so that goods can be conveyed along the conveyor belt section past the goods switch. In this second position, the goods switch for example closes an opening in a boundary wall, behind which the packing bay associated to the first position is arranged, so that no goods can get into this packing bay.

In principle, it is also conceivable and possible that the goods switch has more than two positions, for example three or four positions, in order to convey goods into different packing bays in dependence on its position. In this case, more than two packing bays, for example three or four packing bays are provided, which depending on the position of the goods switch can be filled with goods.

In this case, it can also be advantageous that on two sides each the goods switch has a diverting wall on which one or more discontinuities are formed, so that depending on its position the goods switch can divert goods on its first side or on its second side.

In an advantageous aspect, the packing bay system includes a driving device which is formed for electromotively adjusting the goods switches. The driving device for example can include a suitable electric motor which is coupled with the goods switch via a transmission and can be driven for adjusting the goods switch.

For controlling the driving device a control device can be provided in this case, which is formed to actuate the driving device for adjusting the goods switch in dependence on a goods checkout operation carried out at the packing bay system. Adjusting of the goods switch thus can be effected in an automatic way via the control device and the driving device, in particular without manual action by a cashier. For this purpose, the control device can be formed to monitor a goods checkout operation and in particular detect the end of a goods checkout operation, so that upon completion of a goods checkout operation the goods switch can be adjusted and thus another packing bay can be made accessible.

The idea underlying the invention will be explained in detail below with reference to the exemplary embodiments illustrated in the Figures.

BRIEF DESCRIPTION OF THE DRAWINGS

FIG. 2B shows a top view of the arrangement according to FIG. 2A.

FIG. 3A shows a perspective view of the packing bay system, when the goods switch is adjusted out of the first position.

FIG. 3B shows a top view of the arrangement according to FIG. 3A.

FIG. 4A shows a perspective representation of the packing bay system, with the goods switch in a second position.

FIG. 4B shows a top view of the arrangement according to FIG. 4A.

FIGS. 5A-5E show views of a packing bay system according to the prior art, in different positions of a goods switch.

DETAILED DESCRIPTION

Figure 1:
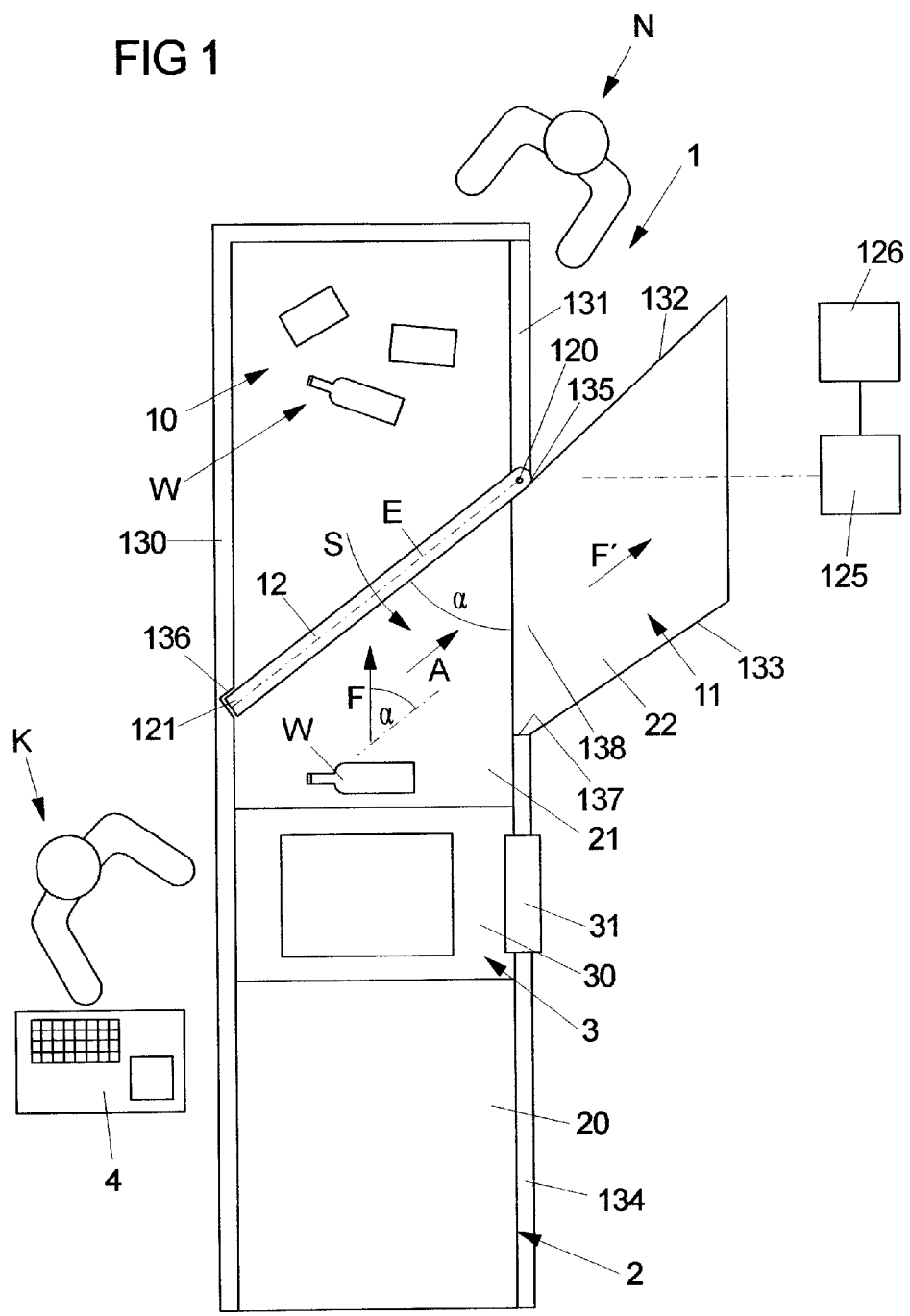
FIG. 1 shows a schematic view of a packing bay system.
Figure 2A:
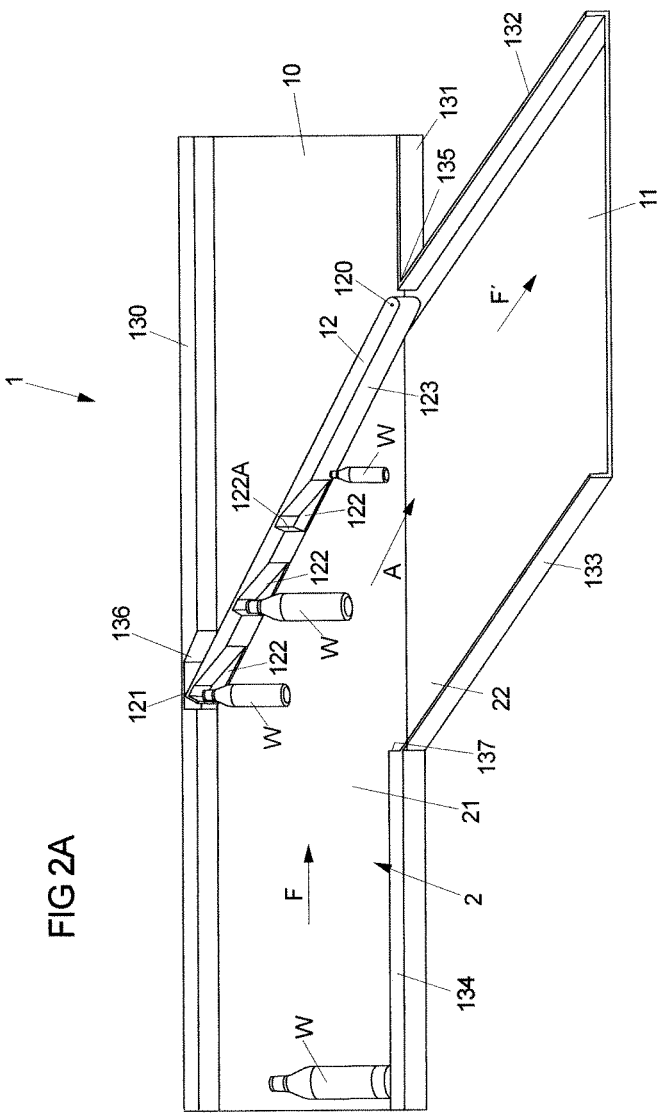
FIG. 2A shows a perspective view of a packing bay system, in a first position of a goods switch.

FIG. 1 shows a schematic representation of a packing bay system 1, as it can be used on a goods checkout system.

The packing bay system 1 comprises a conveying device 2 which is formed by different conveyor belt sections 20, 21, 22. The conveyor belt sections 20, 21, 22 here have different functions and conveying directions.

In particular, a first conveyor belt section 20 is provided upstream of a goods detection device 3, which comprises a balance 30 and a scanner 31 for scanning goods W, along a conveying direction F, so that goods W can be guided over this first conveyor belt section 20 towards the goods detection device 3. At the goods detection device 3 the goods W then can be detected and registered, so that a cashier K can initiate a payment operation via a checkout device 4.

After detection at the goods detection device 3, the goods W can be put onto a second conveyor belt section 21 by the cashier K, in order to be guided by means of this second conveyor belt section 21 in the conveying direction F towards one of several packing bays 10, 11. The packing bays 10, 11 serve to take up goods W, in order to enable a customer N to remove and pack the goods W.

In the concrete exemplary embodiment, the packing bay system 1 includes two packing bays 10, 11 which are separated from each other by a goods switch 12. Depending on the position of the goods switch 12, goods W conveyed on the conveyor belt section 21 get either into the one packing bay 10 or into the other packing bay 11.

In the illustrated exemplary embodiment, the one packing bay 10 is arranged behind the goods switch 12 in conveying direction F, while the other packing bay 11 obliquely branches off from the conveyor belt section 21. Depending on the position of the goods switch 12, goods W thus can be diverted from the conveyor belt section 21 in a diverting direction A into the packing bay 11 branching off obliquely, or the goods W are conveyed further on the conveyor belt section 21 along the conveying direction F and thus get into the packing bay 10.

In the illustrated exemplary embodiment, a further conveyor belt section 22 is associated to the packing bay 11 branching off obliquely, which conveys goods W into the packing bay 11 in an oblique conveying direction F'. In principle, however, such additional conveyor belt section 22 also can be omitted; by diverting at the goods switch 12, goods W also can passively slip into the packing bay 11.

In the illustrated exemplary embodiment, the goods switch 12 is formed web- or rod-shaped and longitudinally extends along a direction of longitudinal extension E. With one end 120 the goods switch 12 here is articulated to a first lateral boundary wall 131, extends—in the position shown in FIG. 1—obliquely across the conveyor belt section 21 towards a second boundary wall 130, and protrudes into an indentation 136 at this second boundary wall 130.

In the illustrated position, the goods switch 12 describes an angle α with the conveying direction F. This oblique position of the goods switch 12 leads to the fact that goods which on conveyance in the conveying direction F on the conveyor belt section 21 get in contact with the goods switch 12 are guided in a diverting direction A directed parallel to the direction of longitudinal extension E in direction of the packing bay 11 branching off obliquely and thus get into the region of this packing bay 11.

The goods switch 12 is pivotable along a swivel direction S and in this way can be moved out of the illustrated first position. In a second position, the goods switch 12 with its direction of longitudinal extension E is directed parallel to the conveying direction F and closes an opening 138 between boundary walls 131, 134, so that unimpeded by the goods switch 12 goods W can be conveyed in the conveying direction F towards the packing bay 10.

The packing bay 11 branching off obliquely is defined by boundary walls 132, 133 extending obliquely to the boundary walls 131, 134. The goods switch 12 is articulated in the region of a kink 135 between the lateral boundary wall 131 of the packing bay 10 and the lateral boundary wall 132 of the packing bay 11. The opening 138 associated to the packing bay 11 is formed between the kink 135 and an edge 137 of the boundary wall 134.

While goods W which are not formed cylindrical and thus are not easily rollable can easily and reliably be diverted in diverting direction A from the conveyor belt section 21 in direction of the packing bay 11 branched off by striking against the goods switch 12, it can occur in cylindrical, rollable goods, for example bottles or cans, that such goods are put into a rolling movement and thereby move along the goods switch 12 against the diverting direction A.

This is illustrated with reference to FIGS. 5A to 5E.

FIG. 5A shows the packing bay system 1 in the first position of the goods switches 12 extending obliquely to the conveying direction F. When goods are conveyed on the conveyor belt section 21 in the conveying direction F, the goods W together with the conveyor belt section 21 move in a direction of movement B corresponding to the conveying direction F and get in contact with the diverting wall 123 of the goods switch 12 directed obliquely to the conveying direction F (FIG. 5B).

By contact with the goods switch 12, a further movement of the goods W in the conveying direction F is blocked. When the goods W are cylindrical, rollable objects, for example bottles or cans, the goods W are put into a rolling movement R, due to the fact that the conveyor belt section 21 moves further in the conveying direction F and thereby rotates the goods W about their respective longitudinal axis L.

First of all, this effects that the longitudinal axes L of the goods W are aligned transversely to the conveying direction F, as is shown in FIG. 5B. Due to the frictional contact of the goods W with the diverting wall 123, it occurs at the same time that the goods W rollingly move along the diverting wall 123 of the goods switch 12 in a direction of movement B' against the diverting direction A and thus ascend at the goods switch 12 against the diverting direction A, as is shown in FIG. 5C.

It thereby is effected that the goods W move against the conveying direction F and thus possibly get out of the region of the goods switch 12. When the goods switch 12 now is adjusted out of the first position in the swivel direction S, as is shown in FIG. 5D, the goods switch 12 possibly is moved past at least a part of the goods W, so that the same remain on the conveyor belt section 21 and are not also conveyed into the packing bay 11 branching off, into which the goods W actually should have come. If this is not detected, a customer N possibly does not completely remove his/her goods W, although he/she has paid for the goods W.

Figure 5E:
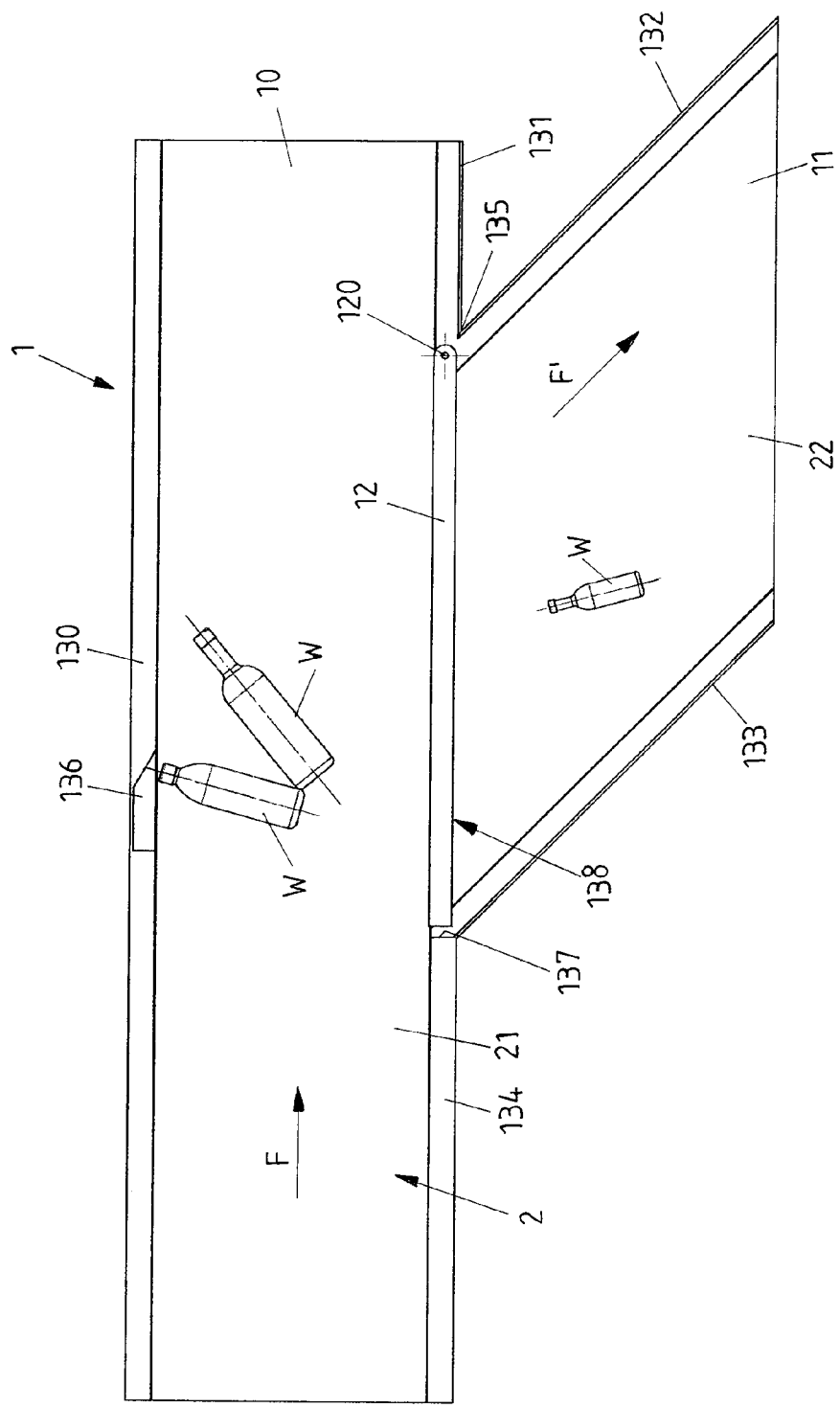

When the goods switch 12 completely has been moved into the second position, as is shown in FIG. 5E, the goods W at least partly still are on the conveyor belt section 21 and thus outside the packing bay 11. The goods W thus are conveyed into the other packing bay 10 by mistake.

To prevent this disadvantageous effect, it is provided in an exemplary embodiment realizing the invention according to FIGS. 2A, 2B to 4A, 4B that discontinuities 122 in the form of depressions molded into the diverting wall 123 are provided on the diverting wall 123 of the goods switch 12. These discontinuities 122 have the effect that rolling goods W which move along the goods switch 12 in a direction of movement B' (see FIGS. 5B and 5C) against the diverting direction A get in engagement with the discontinuities 122 and thus cannot be moved along the goods switch 12 beyond the discontinuities 122. The discontinuities 122 prevent a movement of goods W against the diverting direction A along the goods switch 12 and thus prevent that the goods W can get out of the region of the goods switch 12.

In the exemplary embodiment according to FIGS. 2A, 2B to 4A, 4B the discontinuities 122 each have a transverse flank 122A against which a goods object W strikes upon movement against the diverting direction A, so that a further movement of the goods object W beyond the flank 122A is not possible.

Several discontinuities 122 here are formed on the diverting wall 123 offset along the diverting direction A, so that several goods objects W can be taken up in different discontinuities 122.

When in this packing bay system 1 the goods switch 12 is adjusted out of the first position, as is shown in FIGS. 3A, 3B, the goods W are moved along with the goods switch 12 by their engagement into the discontinuity 122 and thus are reliably conveyed into the region of the associated packing bay 11. It thus is ensured that no goods W, which are to be conveyed into the packing bay 11, remain on the conveyor belt section 21.

When the goods switch 12, as shown in FIGS. 4A and 4B, has been adjusted into the second position, the goods W detected at the discontinuities 122 also have come into the region of the packing bay 11. The goods switch 12 now blocks the opening 138 between the boundary walls 131, 134, so that further goods W can be conveyed on the conveyor belt section 21 along an outside 124 of the goods switch 12 in direction of the other packing bay 10.

The discontinuities 122 are to be formed such that a movement of goods against the diverting direction A beyond the discontinuities is reliably prevented. A movement of goods W in the diverting direction A, on the other hand, must not be blocked by the discontinuities 122.

Figure 6:
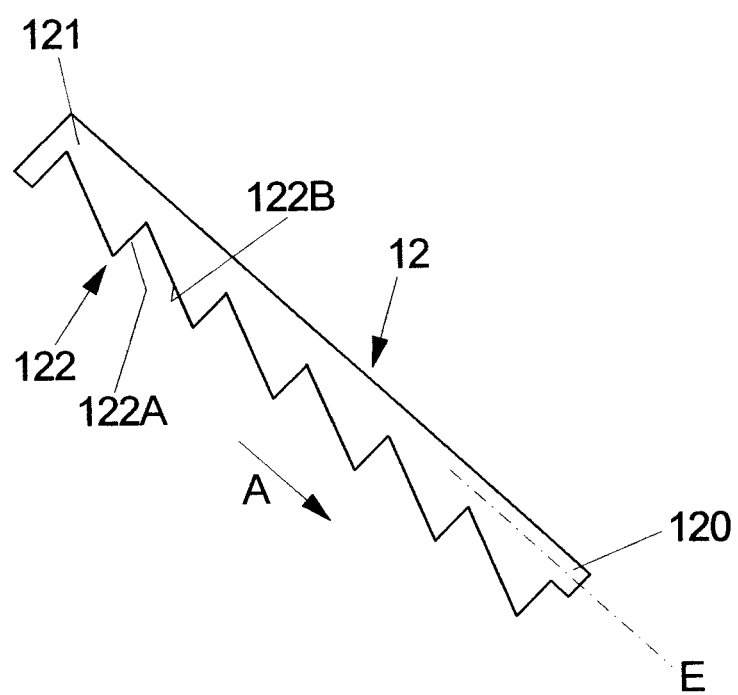
FIG. 6 shows a schematic view of a goods switch with sawtooth-shaped discontinuities arranged thereon.

For this purpose, as is schematically shown in FIG. 6, the discontinuities for example can have a sawtooth shape, wherein a vertical flank 122A blocks a movement against the diverting direction A, but a flank 122B extending obliquely to the diverting direction A permits a movement in the diverting direction A along the diverting wall 123.

Other configurations of discontinuities 122 also are conceivable and possible. For example, the discontinuities 122 can be designed in the manner of transversely protruding webs or the like.

The idea underlying the invention is not limited to the exemplary embodiments described above, but in principle can also be realized in completely different embodiments.

In particular, a packing bay system in principle also can include more than two packing bays, for example three, four or even more packing bays.

A goods switch also can include more than two positions for guiding goods in direction of two or more packing bays.

In addition, more than one goods switch also can be provided.

LIST OF REFERENCE NUMERALS

1 packing bay system
10, 11 packing bay
12 goods switch
120, 121 end
122 discontinuity
122A transverse flank
122B flank
123 diverting wall
124 side
125 driving device
126 control device
130-134 boundary wall
135 kink
136 indentation
137 edge
138 opening
2 conveying device
20, 21, 22 conveyor belt section
3 goods detection device
30 balance
31 scanner
4 checkout device angle
A diverting direction
B, B', B" direction of movement
E direction of longitudinal extension
F, F' conveying direction
K cashier
L longitudinal axis
N customer
R rolling movement
S swivel direction
W merchandise

What is claimed is:

1. A packing bay system for a goods checkout system, comprising:
a conveying device that includes at least one conveyor belt section for conveying goods in a conveying direction from an upstream location to a downstream location, the conveyor belt section having opposite first and second sides aligned along the conveyor belt section;
first and second packing bays for taking up the goods, the first packing bay being in proximity to the downstream end of the conveyor belt section, the second packing bay being branched from a location on the first side of the conveyor belt section at a position between the upstream and downstream locations and extending to a location transverse of the conveyor belt section; and
a goods switch that includes a diverting wall with opposite first and second ends linearly spaced from one another by a specified length, the first end being mounted pivotally to a location adjacent the first side of the conveyor belt section downstream of and adjacent to the location where the second packing bay branches from the conveyor belt section, wherein the diverting wall is pivotable about the first end between a first position where the diverting wall extends at a specified acute angle to the conveying direction across the at least one conveyor belt section with the second end being at the second side of the conveyor belt section and upstream of the first end in order to guide goods in a diverting direction from the at least one conveyor section towards the second packing bay, and a second position where the second end of the diverting wall is at the first side of the conveyor belt section upstream of said location where the second packing bay branches from the conveyor belt section to block the second packing bay and to convey goods towards the first packing bay,
wherein the diverting wall of the goods switch includes opposite first and second sides extending from the first end to the second end, the first side of the diverting wall extending along the first side of the conveyor belt section when the diverting wall is in the second position and being substantially linear so as not to impede movement of the goods to the first packing bay, the second side of the diverting wall including at least one discontinuity to prevent a movement of goods along the diverting wall against the diverting direction when the diverting wall is in the first position.

2. The packing bay system according to claim 1, wherein the discontinuity is formed as depression molded into the diverting wall or as protrusion protruding from the diverting wall.

3. The packing bay system according to claim 1, wherein the discontinuity forms at least one transverse flank extending transversely to the diverting direction.

4. The packing bay system according to claim 1, wherein the discontinuity is formed to not prevent a movement of goods in the diverting direction along the diverting wall.

5. The packing bay system according to claim 1, wherein in the second position the goods switch extends parallel to the conveying direction.

6. The packing bay system according to claim 1, wherein several discontinuities are formed on the diverting wall.

7. The packing bay system according to claim 6, wherein the several discontinuities have a sawtooth shape.

8. The packing bay system according to claim 1, further comprising a driving device for electromotively adjusting the goods switch.

9. The packing bay system according to claim 8, further comprising a control device for controlling the driving device for adjusting the goods switch in dependence on a goods checkout operation carried out at the packing bay system.

* * * * *